T. V. CURTIS & A. M. ANDREWS.
Hoe and Cultivator.

No. 203,598. Patented May 14, 1878.

Attest
A. W. Durley
Q. O. Curtis

Inventor
Thomas V. Curtis
A Milton Andrews
Chas. H. Fowler.
Attorney.

UNITED STATES PATENT OFFICE.

THOMAS V. CURTIS AND A. MILTON ANDREWS, OF LEMARS, IOWA, ASSIGNORS TO SAID CURTIS.

IMPROVEMENT IN HOES AND CULTIVATORS.

Specification forming part of Letters Patent No. 203,598, dated May 14, 1878; application filed January 14, 1878.

*To all whom it may concern:*

Figure 1:
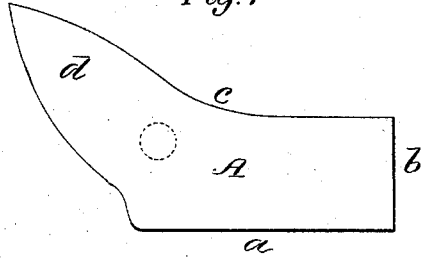
Figure 2:
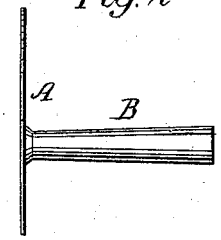
Figure 3:
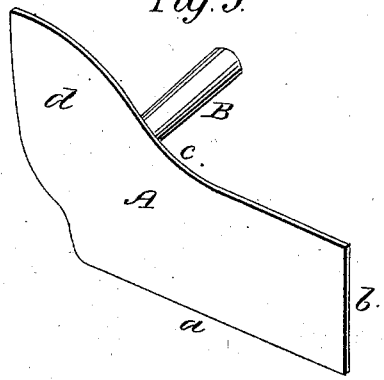

Be it known that we, THOMAS V. CURTIS and A. MILTON ANDREWS, both of Lemars, in the county of Plymouth and State of Iowa, have jointly invented a Floral and Garden Hoe and Cultivator Combined, of which the following is a specification:

Figure 1 is a plan view of the hoe; Fig. 2, a side elevation, and Fig. 3 a perspective view, of the same.

This invention has relation to floral and garden hoes; and consists in constructing such an implement in a manner as will admit of the same being used for various purposes, as hereinafter described, and subsequently pointed out in the claim.

In the accompanying drawings, A represents the blade of a hoe, having secured thereto or made with said blade a ferrule, B. The blade may be constructed of any suitable metal and any desired size, and the ferrule B should be attached thereto at the required point or place to preserve the proper balance. The blade A is constructed with a straight edge, $a$, to be used for flat hoeing in vegetables or flowers or for similar uses, it taking the place of the common garden-hoe. The square end $b$ of the hoe is designed to be used for thinning plants in drills or rows.

The hoe, opposite the straight edge $a$, has a curved edge, $c$, to be used for borders and general use. The cultivator part or point of the hoe $d$ is designed for the purpose of drawing drills, and works close up to and in between the plants, and it may also be used for loosening the mold around vegetables or flowers.

It will be seen that this is a very simple as well as useful garden implement, that can be used for many purposes in the garden or lawn; and, particularly, the facility with which it can be used for cleaning and cultivating flowers with comparatively little labor will be apparent.

What we claim as new, and desire to secure by Letters Patent, is—

A garden-hoe consisting of the blade A, formed with straight edge $a$, end $b$, curved edge $c$, and cultivator-point $d$, substantially as and for the purpose set forth.

THOMAS V. CURTIS.
A. MILTON ANDREWS.

Witnesses:
A. W. DURLEY,
O. D. CURTIS.